United States Patent [19]

Röhm

[11] Patent Number: 5,435,578
[45] Date of Patent: Jul. 25, 1995

[54] LOCKABLE SELF-TIGHTENING HAMMER-DRILL CHUCK

[76] Inventor: Günter H. Röhm, Heinrich-Röhm-Strasse 50, D-89567 Sontheim, Germany

[21] Appl. No.: 225,525

[22] Filed: Apr. 11, 1994

[30] Foreign Application Priority Data

Apr. 27, 1993 [DE] Germany .................. 43 13 742.3

[51] Int. Cl.⁶ .................................................. B23B 31/12
[52] U.S. Cl. .................................. 279/62; 279/140; 279/902
[58] Field of Search ............................. 279/60–65, 279/140, 902

[56] References Cited

U.S. PATENT DOCUMENTS

| | | |
|---|---|---|
| 4,272,087 | 6/1981 | Röhm . |
| 4,583,751 | 4/1986 | Rohm ............... 279/60 |
| 5,236,206 | 8/1993 | Rohm ............... 279/60 |
| 5,375,857 | 12/1994 | Rohm ............... 279/140 |
| 5,375,858 | 12/1994 | Rohm ............... 279/63 |

*Primary Examiner*—Steven C. Bishop
*Attorney, Agent, or Firm*—Herbert Dubno; Andrew Wilford

[57] ABSTRACT

A self-tightening chuck has a chuck body centered on an axis and adapted to be rotated thereabout, a plurality of jaws radially displaceable on the body, and an adjustment sleeve rotatable on the body, formed with radially inwardly directed teeth, and engaged with the jaws such that rotation of the adjustment sleeve on the body in a forward direction displaces the jaws radially inward on the body and opposite rotation in a reverse direction displaces the jaws radially outward. A tightening ring rotatable on the body has stop formations for limiting its rotation on the body to a predetermined angular travel and a tightening spring braced angularly between the tightening ring and the body urges the tightening ring angularly in the forward direction. A locking body radially displaceable on the tightening ring is formed with teeth meshable with the tightening-ring teeth. A locking spring braced radially against the locking body urges the locking-body teeth into mesh with the adjustment-sleeve teeth. A locking ring angularly displaceable on the chuck body has a formation engageable with the body and displaceable between an unlocked position displacing the locking body radially inward out of engagement with the adjustment sleeve and a locked position leaving the locking body pressed radially by its locking spring against the adjustment sleeve. Stop formations engageable with the locking ring limit angular travel of the locking ring on the chuck.

15 Claims, 6 Drawing Sheets

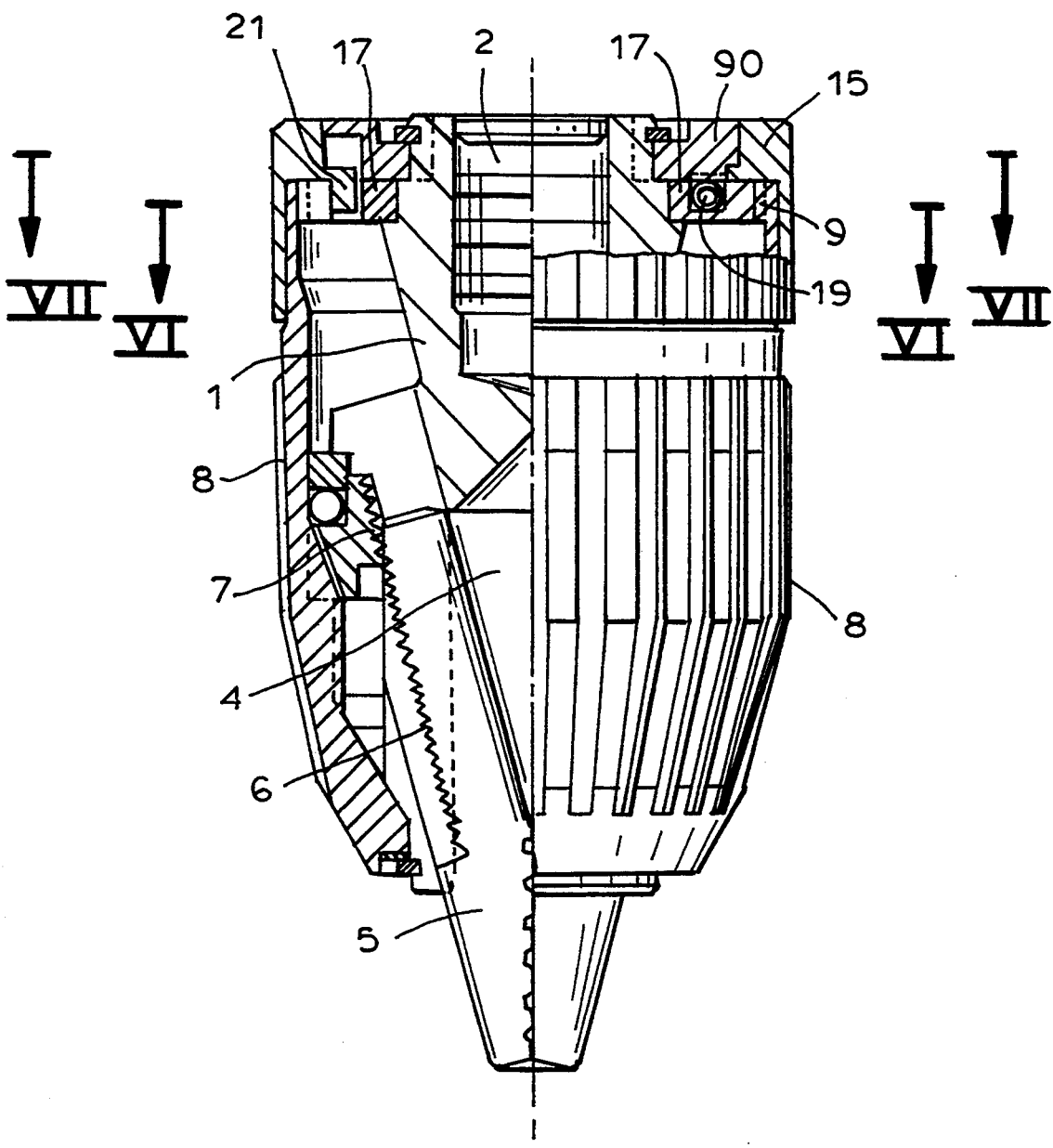
F I G. 5

LOCKABLE SELF-TIGHTENING HAMMER-DRILL CHUCK

FIELD OF THE INVENTION

The present invention relates to a drill chuck. More particularly this invention concerns a self-tightening and lockable hammer-drill chuck.

BACKGROUND OF THE INVENTION

A self-tightening chuck for a hammer drill normally has a chuck body centered on an axis and adapted to be rotated there-about, a plurality of jaws radially displaceable on the body, and an adjustment sleeve rotatable on the body, formed with radially inwardly directed teeth, and engaged with the jaws such that rotation of the adjustment sleeve on the body in a forward direction displaces the jaws radially inward on the body and opposite rotation in a reverse direction displaces the jaws radially outward. A locking body radially displaceable on the chuck body is formed with teeth meshable with the tightening-ring teeth and a locking spring braced radially against the locking body urges the locking-body teeth into mesh with the adjustment-sleeve teeth. The locking-body and adjustment-sleeve teeth are angled such that they lock together and rotationally couple the locking body to the adjustment sleeve on forward rotation of the chuck body relative to the adjustment sleeve but slide past each other on forward rotation of the adjustment sleeve relative to the chuck body. A locking ring angularly displaceable on the chuck body has a formation engageable with the body and is displaceable between an unlocked position displacing the locking body radially inward out of engagement with the adjustment sleeve and a locked position leaving the locking body pressed radially by its locking spring against the adjustment sleeve.

As described in my U.S. Pat. No. 4,272,087 such a chuck is actuated by a standard geared chuck key. Here the locking body is a chordally movable pin whose flat end fits between the ad-justment-body teeth, which in this situation are shaped as isoscelese right triangles. The end of the locking pin is perpendicular to its longitudinal axis and sits flatly against the trailing flanks of the adjustment-sleeve teeth, that is with the pin axis extending at 45° to a radius through the chuck axis. The locking pin is angled such that when the adjustment sleeve is rotated forward relative to the chuck body the pin ratchets on the adjustment-sleeve teeth, but on opposite rotation the teeth lock on each other and loosening of the chuck is prevented.

With such a chuck the user must twist the locking ring to the unlocked position so the adjustment sleeve can be rotated backward to release the bit. Then after a new bit is chucked, the locking ring must again be reset in the locked position to prevent the chuck from getting loose from vibration. Furthermore if during use the chuck loosens, for instance because the jaws bite into the shank of the bit, the user must manually retighten the chuck.

OBJECTS OF THE INVENTION

It is therefore an object of the present invention to provide an improved drill chuck.

Another object is the provision of such an improved drill chuck which overcomes the above-given disadvantages, that is which automatically is unlocked when a tool is dechucked, is automatically locked when it is tightened on a tool, and which self-tightens when in use.

SUMMARY OF THE INVENTION

A self-tightening chuck has according to the invention a chuck body centered on an axis and adapted to be rotated there-about, a plurality of jaws radially displaceable on the body, and an adjustment sleeve rotatable on the body, formed with radially inwardly directed teeth, and engaged with the jaws such that rotation of the adjustment sleeve on the body in a forward direction displaces the jaws radially inward on the body and opposite rotation in a reverse direction displaces the jaws radially outward. A tightening ring rotatable on the body has stop formations for limiting its rotation on the body to a predetermined angular travel and a tightening spring braced angularly between the tightening ring and the body urges the tightening ring angularly in the forward direction. A locking body radially displaceable on the tightening ring is formed with teeth meshable with the tightening-ring teeth. A locking spring braced radially against the locking body urges the locking-body teeth into mesh with the adjustment-sleeve teeth. The locking-body and adjust-ment-sleeve teeth are angled such that they lock together and rotationally couple the locking body and tightening ring to the adjustment sleeve on forward rotation of the tightening ring relative to the adjustment sleeve but slide past each other on forward rotation of the adjustment sleeve relative to the tightening ring. A locking ring angularly displaceable on the chuck body has a formation engageable with the body and displaceable between an unlocked position displacing the locking body radially inward out of engagement with the adjustment sleeve and a locked position leaving the locking body pressed radially by its locking spring against the adjustment sleeve. Stop formations engageable with the locking ring limit angular travel of the locking ring on the chuck body to an angular travel that is greater than the angular travel of the tightening ring on the chuck body.

The chuck according to this invention is operated by gripping the locking ring in one hand and the adjustment sleeve in the other and relatively twisting them in the forward closing or backward opening direction, depending on what is wanted. As the adjustment ring is turned backward to open the chuck it first entrains the tightening ring backward against the force of the locking spring to pivot it relative to the locking ring, effectively moving the locking ring into the unlocked position so that further backward rotation retracts the jaws. Forward rotation similarly first moves the locking ring into the locked position and thereafter advances the jaws, with ratcheting of the adjustment-body teeth on the locking-body teeth. Such operation is intuitive and involves no careful gripping and/or manipulation of, for instance, the tightening ring. On tightening the forward torque is applied directly to the adjustment sleeve so that the chuck can be made very tight. Once tightened, the tightening spring will be loaded to rotate the adjustment sleeve forward if the chuck loosens.

According to a further feature of this invention, a latch is engaged between the locking ring and the tightening ring for defining a pair of stable end positions corresponding to the locked and unlocked positions of the locking ring. Thus when the chuck is opened, the latch will lock the tightening ring in a position with the tightening spring loaded so that when the chuck is subsequently tightened, the tightening spring will automatically be compressed or tensioned, depending on how it works.

To this end the tightening string has one end bearing directly on the chuck body and an opposite end bearing directly on the tightening ring. In addition the latch includes spring means retaining the locking ring in its positions with a predetermined force which is greater than a force exerted by the tightening spring on the tightening ring. Thus when the locking ring is in the locked position, the tightening spring cannot move it into the unlocked position. The latch can include a pair of angularly offset seats in one of the rings, a cam bump projecting from the other of the rings and engaged in the seats in the end positions, and some sort of spring for permitting elastic deflection of the bump and seats toward and away from each other. In a simple embodiment the other ring is formed with a radially deflectable finger constituting the latch spring and carrying the bump. This finger can also form the locking spring and lock body.

In another arrangement the locking body is radially displaceable in the tightening ring. The locking ring has a cam engageable with the locking body in the unlocked position to press it radially inward and decouple the locking-body teeth from the adjustment-sleeve teeth. The teeth are sawteeth and each have a steep flank and a shallow flank. The steep flanks of the tightening-ring teeth lead the respective shallow flanks in the forward direction, and vice versa on the adjustment sleeve.

The stop formations that limit rotation of the tightening ring on the chuck body can include a pair of radially directed flats extending at a predetermined angle to each other on the chuck body and a pair of radially oppositely directed flats extending at a different predetermined angle to each other on the tightening ring and engageable with the chuck-body flats.

In another arrangement the chuck body is formed with respective tightening-ring and locking-ring abutments and the tightening ring and locking ring are formed with respective notches receiving the respective abutments and having end faces constituting the respective stop formations. The stop formations limiting angular travel of the locking ring on the chuck body include cooperating formations on the tightening ring and the locking ring so that the angular travel of the locking ring is made up of the angular travel of the tightening ring on the chuck body plus the angular travel of the locking body on the tightening ring. The tightening spring extends angularly and is braced axially between the tightening ring and the chuck body.

The adjustment sleeve and the locking body according to the invention together extend a full axial length of the chuck body and completely enclose the tightening ring. This makes it easy to grip and operate the chuck and gets the tightening ring completely out of harm's way. The chuck body is also completely encased in the structure so that only those parts needed to operate the chuck—the locking ring and adjustment sleeve—are exposed.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 5 is a view like FIG. 1 of a second embodiment of the instant invention;

SPECIFIC DESCRIPTION

Figure 1:
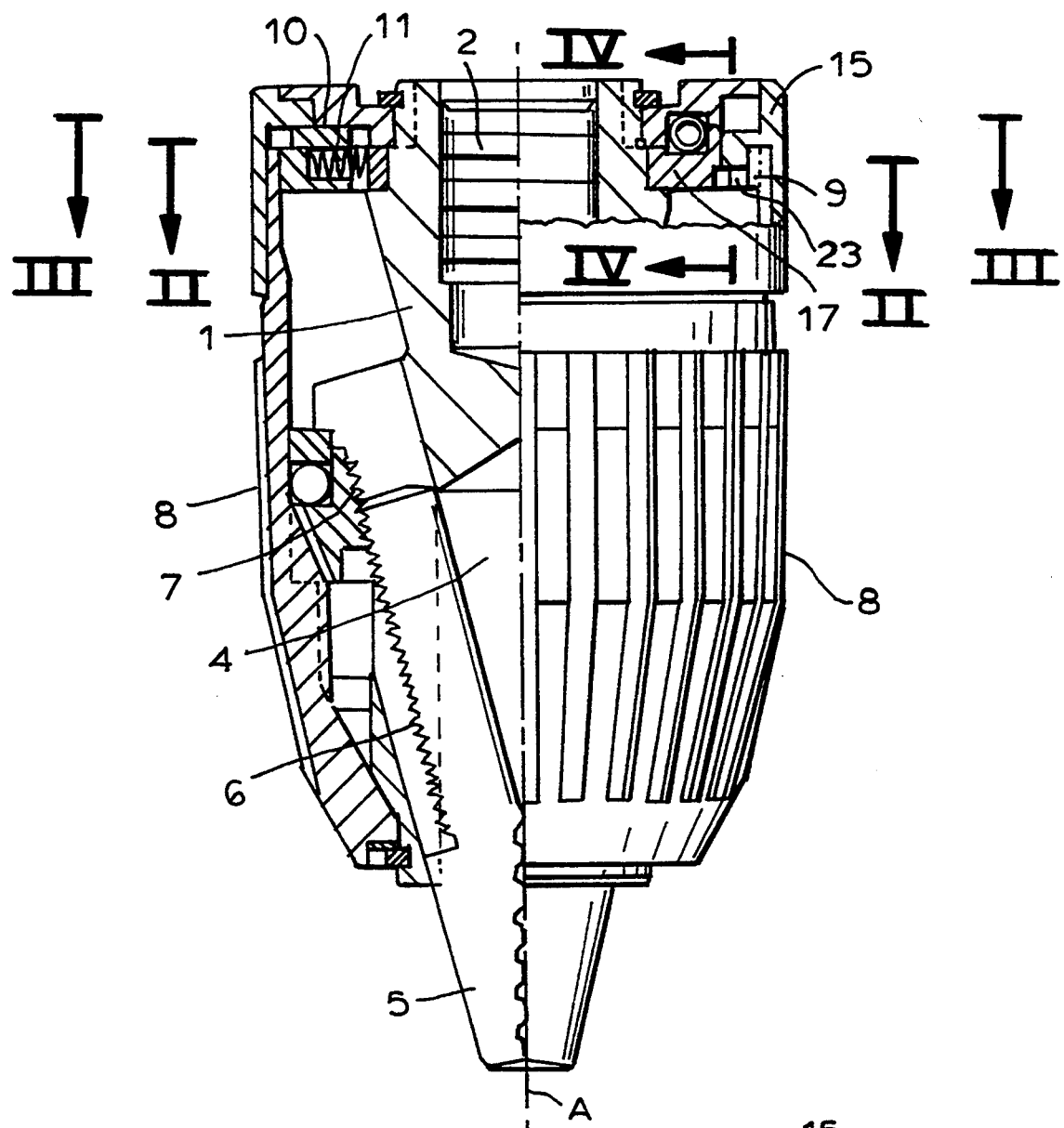
FIG. 1 is a side view partly in axial section of a first embodiment of the invention.

As seen in FIGS. 1 though 4 a chuck according to this invention has a body 1 centered on an axis A and formed on the axis A with a rearwardly open threaded bore 2 that is normally fitted to the spindle of a drill drive unit. A forwardly open bore 4 normally receives an unillustrated tool. (In the embodiment of FIGS. 8 and 9 the body 1 is formed between the bores 2 and 4 with an axial passage 3 through which a rod can pass to hammer on the rear end of the bit held in the bore 4.) Three angularly equispaced jaws 5 are axially and radially displaceable in the body 1 and are each formed along an outer edge with a row of teeth 6 meshing with a screwthread 7 formed on an adjustment sleeve 8 or integral part thereof. The sleeve 8 is axially non-displaceable on the body 1 but can rotate thereon about the axis A. When the sleeve 8 is rotated in a direction 12 it moves the jaws 5 radially outward and when rotated oppositely in a direction 13 it moves them radially toward each other to grip a tool.

At its rear end the adjustment sleeve 8 is internally formed with an array of sawteeth 9 complementarily engageable with sawteeth 14 of a radially displaceable locking body 10 that is urged radially outward by a compression spring 11. These teeth 9 and 14 are shaped such that they lock together when the sleeve 8 tries to rotate relative to the body 1 in the reverse or opening direction 12 on the body 1 but ratchet past each other on opposite rotation of the sleeve 8 on the body 1 in the forward or tightening direction 13, due to the relative inclinations of their steep and shallow flanks, with the steep flanks of the teeth 9 ahead in the direction 12 of the shallow flanks and the teeth 14 oppositely oriented.

A locking ring 15 is formed with a radially inwardly projecting cam formation 30 that can engage an inclined flank surface 31 of the locking body 10 on rotation of the ring 15 on the body 1 in the chuck-closing direction 13 to force same radially inward and thereby disengage the teeth 9 and 14 from each other. Angularly directed abutment surfaces 16 formed on radially outwardly projecting cam formations 50 of a ring 90 fixed on the body 1 and in the ends of radially inwardly open notches 60 formed in the locking ring 15 limit angular displacement of the locking ring 15 relative to the body 1.

The locking body 10 is radially displaceable in a tightening ring 17 having radially outwardly open notches 61 defining angularly spaced abutments 18 that are engageable with an axially projecting cam 51 formed on the ring 90 fixed on the body 1. A spring 19 lodged in a groove 91 formed in the ring 90 is braced between a pin 92 formed the tightening ring 17 and the body 1 to urge the ring 17 in the forward locking direction 13. The angular travel of the cams 51 in the notches 61 is longer than the angular travel of the cams 50 in the notches 60, so that the locking ring 15 can rotate on the chuck body 1 through a greater angle than the tightening ring 17.

In order to releasably hold the chuck in the locked and unlocked positions a latch 20 is provided that comprises an axially projecting cam formation 21 on the locking ring 15 and a pair of cam seats 22 separated by a bump 23 on an elastically deformable web 24 of the tightening ring 17. Thus as the locking ring 15 is moved between the end positions defined by the seats 22, the cam 21 moves over and deflects the bump 23 axially. The elasticity of the spring formed by the flexible web 24 is sufficient to overcome the force of the spring 19 so that once the locking ring 15 is set in the unlocked position the tightening spring 19 will not be able to exert enough force to move it therefrom.

In the arrangement of FIGS. 5, 6A, 6B, and 7 a pair of diametrically opposite angularly extending fingers formed unitarily with the tightening ring 17 and separated therefrom by slots 24' form both the end-position latch 20 and the locking body 10. To this end the outer end of the finger forms the body 10 and has the teeth 14. A respective cam bump 21' projecting axially from the locking ring 15 can slide between two seats 22' on the inside edge of each finger to define the end positions for the lock ring 15. When in the seat 22' closest to the floor of the groove 24' the natural elasticity of each finger will allow it to pull radially inward, decoupling the teeth 14 and 9 from each other. Otherwise this embodiment is identical to the embodiment of FIG. 1.

Figure 8:
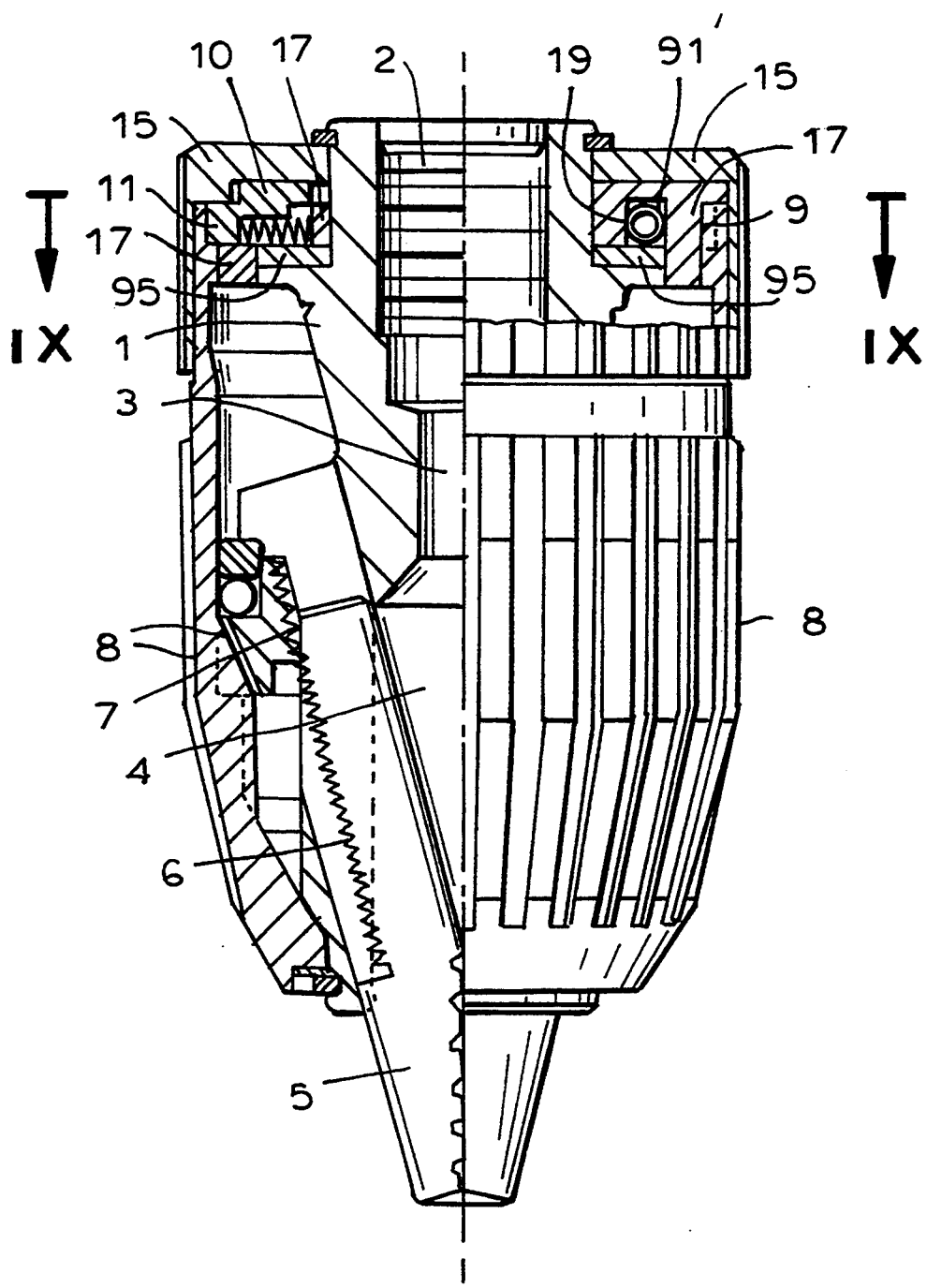
FIG. 8 is a view like FIG. 1 of a third embodiment of the instant invention.
Figure 9:
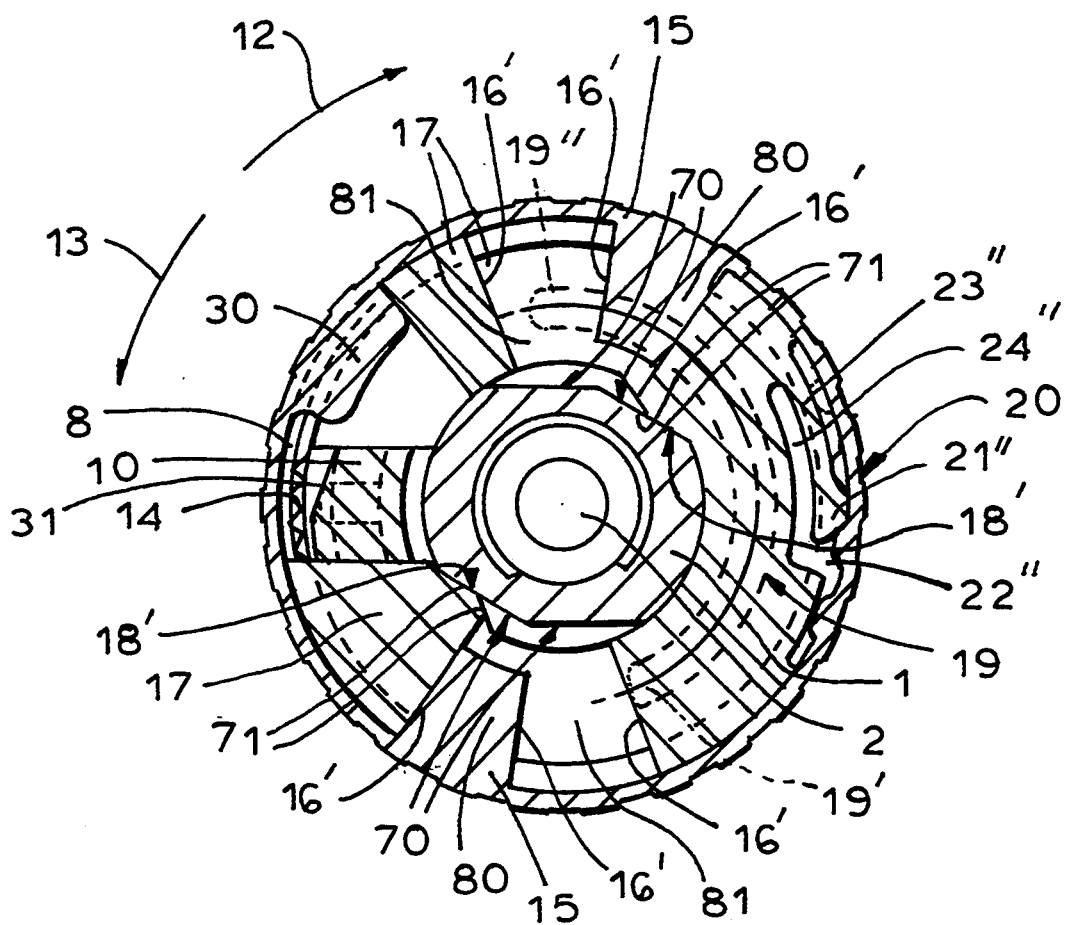
FIG. 9 is a section taken along line IX—IX of FIG. 8.

In the arrangement of FIGS. 8 and 9 the angular travel of the tightening ring 17 on the body 1 is defined by abutments 18' defined by two flats 70 extending along axial planes at an obtuse angle to each other on the body 1 and two more flats 71 similarly extending along axial planes at an obtuse angle to each other on the ring 17. As the ring 17 moves from one end position to the other, the one flat 70 will leave contact with its flat 71 and the other flat 71 will engage the other flat 70.

Here the angular travel of the locking ring 15 is not delimited directly by engagement with the body 1, but with respect to the ring 17 which as described above can move limitedly angularly on the body 1. To this end abutments 16' are constituted as the side faces of radially inwardly projecting cam bumps 80 formed on the ring 15 and projecting into radially outwardly open notches 81 formed in the tightening ring 17. The maximum possible angular travel of the locking ring 15 relative to the chuck body is therefore the sum of the angular travel of the tightening ring 17 relative to the chuck body 1 and of the locking ring 15 relative to the tightening ring 17. Here the spring is a tension spring and is secured at 19' in the tightening ring 17 and at 19" on a washer or ring 95 fixed on the body 1.

The latch 20 in FIGS. 8 and 9 is formed by an angularly extending and radially elastically deflectable finger unitarily formed with the tightening ring 17 and separated therefrom by a slot 24". This finger has an outer end 21" forming the cam bump engageable in seats 22" and over a bump 23" formed on the locking ring 15, and a body 23" forming a spring.

The arrangement of FIGS. 1 through 4 functions as follows:

Presuming the chuck is in the illustrated closed and locked position, it can be tightened by gripping the locking ring 15 in one hand, and gripping the adjustment sleeve 8 in the other hand and rotating it in the forward direction 13. On such movement the body 1 is prevented by the abutments 16 from rotating relative to the locking ring 15. Once thus tightened, the tightening ring 17 and the body 10 are prevented from rotating in the direction 12 by the abutments 18 and the adjustment sleeve 8 is prevented from loosening and rotating in the direction 12, since the sawteeth 14 of the body 10 are locked in its teeth 9.

If during drilling the jaws 5 loosen, for instance because the violence of hammer drilling has caused them to dig into the shank of the bit, the tensioned spring 19 bearing on the pin 92 will rotate the tightening ring 17 and the body 10 in the direction 13, thereby also of course rotating the adjustment sleeve 8 on the body 1 to tighten the chuck.

Figure 4:
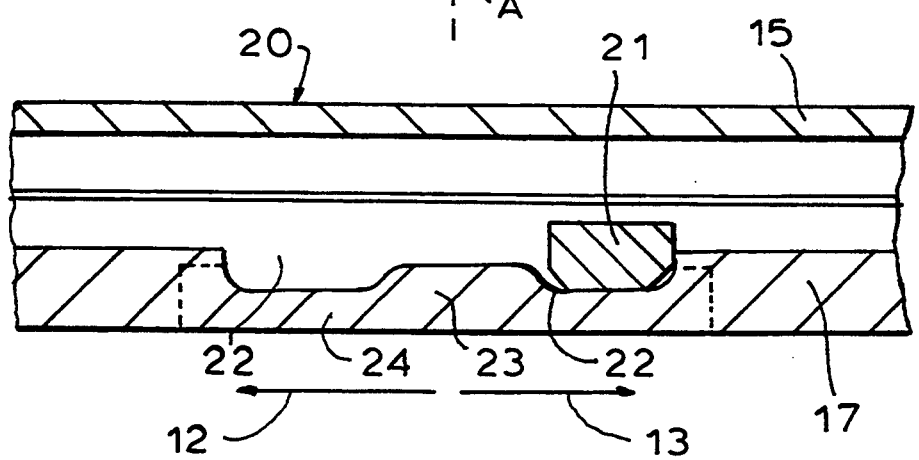
FIGS. 2, 3, and 4 are sections taken along respective lines II—II, III—III, and IV—IV of FIG. 1.
Figure 2:
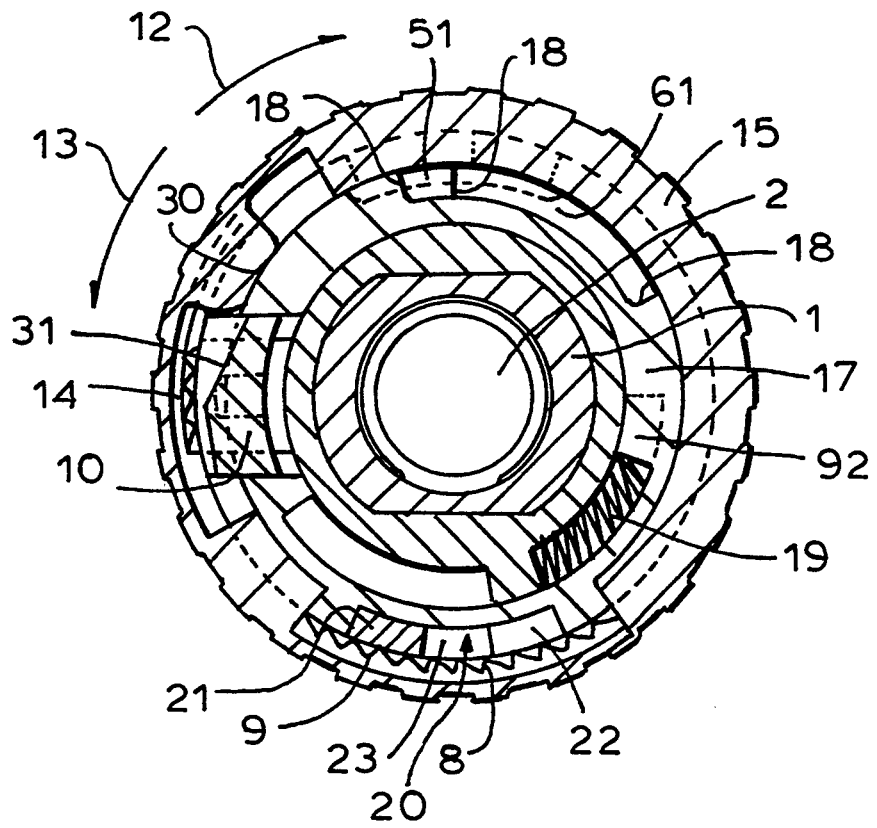
Figure 3:
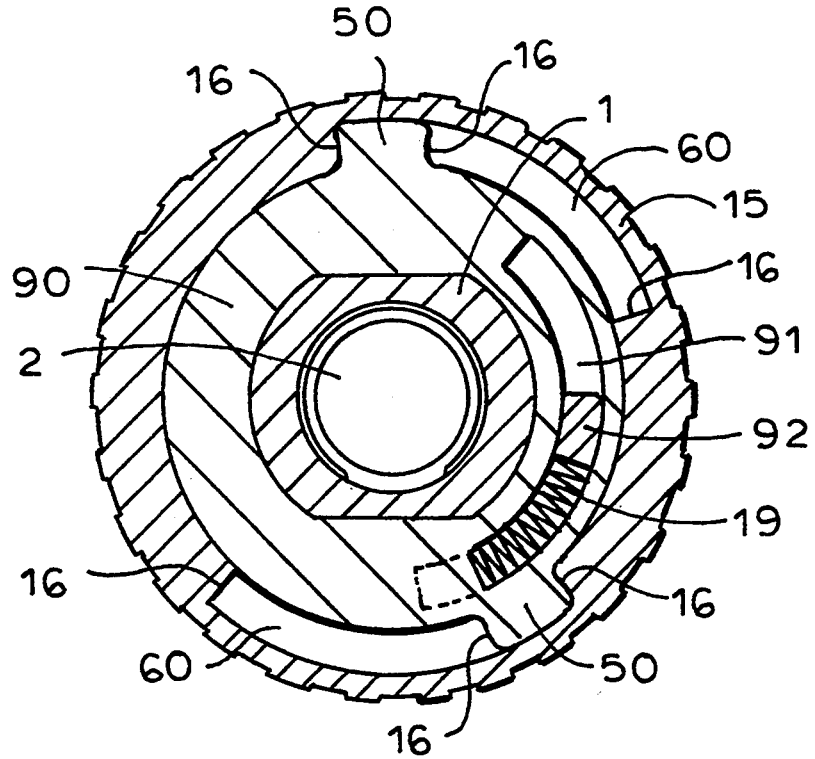
Figure 6A:
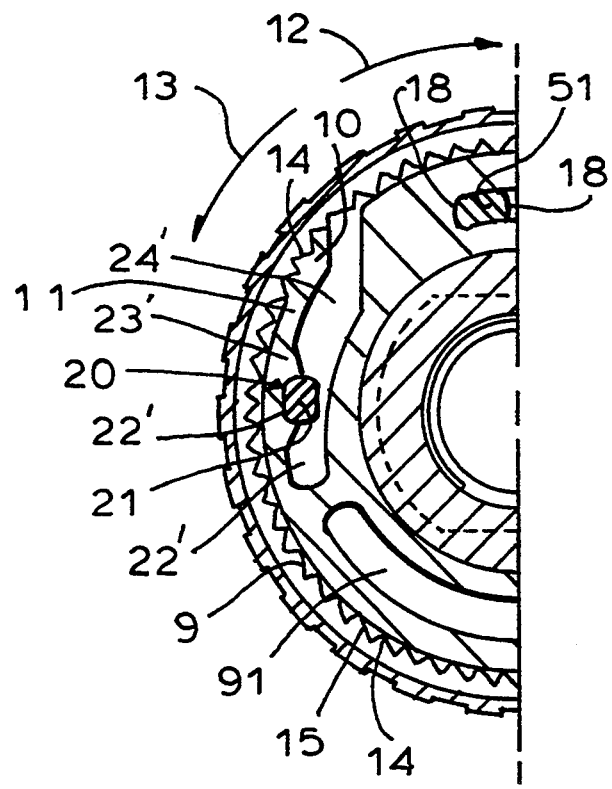
FIGS. 6A and 6B are partial sections corresponding to section plane VI—VI of FIG. 5 but showing the parts respectively in the locked and unlocked positions.
Figure 6B:
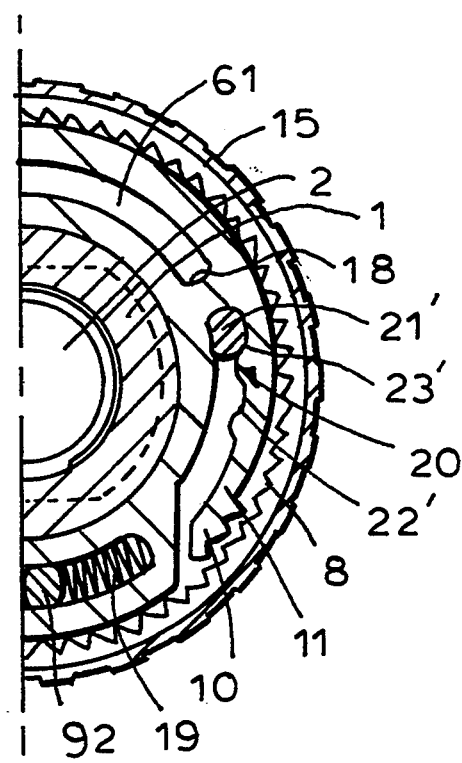
Figure 7:
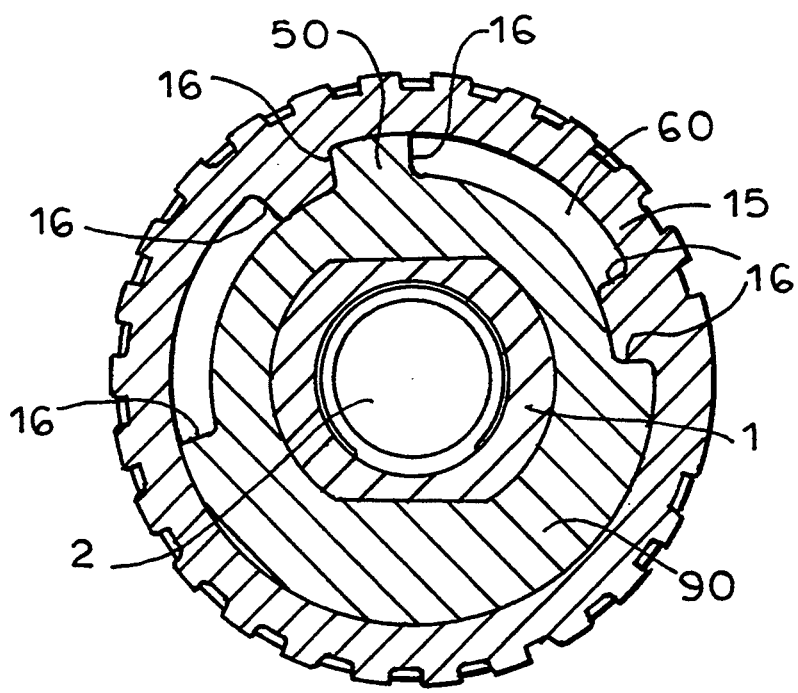
FIG. 7 is a section taken along line VII—VII of FIG. 5.

To open the chuck the locking ring 15 is held in one hand and the adjustment sleeve 8 is rotated with the other hand in the backward release direction 12. Since the chuck is still closed the body 1 will rotate with the adjustment sleeve as will the tightening ring 17. This action moves the cam 21 from the right-hand seat 22 toward the left. In addition the cam 30 will come into engagement with the surface 31 and disengage the body 10 from the sleeve 8, thereby decoupling the tightening ring 17 from the adjustment sleeve 8, but not the body 1 since these parts are still tightened together. Further such rotation brings the cam bump 51 in the direction of arrow 12 to the abutment 18 and the tightening ring 17 is entrained, thereby tensioning the spring 19 until the cam bump 21 is in the left-hand seat 22 (FIG. 4). At the same time the cam bumps 50 move in direction 12 to the ends of the notches 60 so that the chuck body 1 is prevented from rotating any more and the adjustment sleeve 8 rotates relative to this body 1 for the first time since the opening operation started, thereby pulling back the jaws 5.

Thus when opened the spring 19 is tensioned and held in the tensioned condition.

To subsequently close the chuck the locking ring 15 is held in one hand and the adjustment sleeve 8 is rotated with the other hand in the forward tightening direction 13. This action reverses the movements described immediately above.

I claim:
1. A self-tightening chuck comprising:
   a chuck body centered on an axis and adapted to be rotated thereabout;
   a plurality of jaws radially displaceable on the body;
   an adjustment sleeve rotatable on the body, formed with radially inwardly directed teeth, and engaged with the jaws such that rotation of the adjustment sleeve on the body in a forward direction displaces the jaws radially inward on the body and opposite rotation in a reverse direction displaces the jaws radially outward;
   a tightening ring rotatable on the body;
   means including stop formations on the tightening ring for limiting rotation of the tightening ring on the body to a predetermined angular travel;
   a tightening spring braced angularly between the tightening ring and the body and urging the tightening ring angularly in the forward direction;

a locking body radially displaceable on the tightening ring and formed with teeth meshable with the tightening-ring teeth;

a locking spring braced radially against the locking body and urging the locking-body teeth into mesh with the adjustment-sleeve teeth, the locking-body and adjustment-sleeve teeth being angled such that they lock together and rotationally couple the locking body and tightening ring to the adjustment sleeve on forward rotation of the tightening ring relative to the adjustment sleeve but slide past each other on forward rotation of the adjustment sleeve relative to the tightening ring;

a locking ring angularly displaceable on the chuck body, having a formation engageable with the body and displaceable between an unlocked position displacing the locking body radially inward out of engagement with the adjustment sleeve and a locked position leaving the locking body pressed radially by its locking spring against the adjustment sleeve; and means including stop formations engageable with the locking ring for limiting angular travel of the locking ring on the chuck body to an angular travel that is greater than the angular travel of the tightening ring on the chuck body.

2. The self-tightening chuck defined in claim 1, further comprising latch means engaged between the locking ring and the tightening ring for defining a pair of stable end positions corresponding to the locked and unlocked positions of the locking ring.

3. The self-tightening chuck defined in claim 2 wherein the tightening string has one end bearing directly on the chuck body and an opposite end bearing directly on the tightening ring.

4. The self-tightening chuck defined in claim 2 wherein the latch means includes spring means retaining the locking ring in its positions with a predetermined force which is greater than a force exerted by the tightening spring on the tightening ring.

5. The self-tightening chuck defined in claim 2 wherein the latch means includes:

a pair of angularly offset seats in one of the rings;

a cam bump projecting from the other of the rings and engaged in the seats in the end positions; and spring means for permitting elastic deflection of the bump and seats toward and away from each other.

6. The self-tightening chuck defined in claim 5 wherein the other ring is formed with a radially deflectable finger constituting the spring means and carrying the bump.

7. The self-tightening chuck defined in claim 6 wherein the finger also forms the locking spring and lock body.

8. The self-tightening chuck defined in claim 1 wherein the locking body is radially displaceable in the tightening ring.

9. The self-tightening chuck defined in claim 8 wherein the locking ring has a cam engageable with the locking body in the unlocked position to press it radially inward and decouple the locking-body teeth from the adjustment-sleeve teeth.

10. The self-tightening chuck defined in claim 1 wherein the teeth are sawteeth and each have a steep flank and a shallow flank, the steep flanks of the tightening-ring teeth leading the respective shallow flanks in the forward direction.

11. The self-tightening chuck defined in claim 1 wherein the stop formations for limiting rotation of the tightening ring on the chuck body include a pair of radially directed flats extending at a predetermined angle to each other on the chuck body and a pair of radially oppositely directed flats extending at a different predetermined angle to each other on the tightening ring and engageable with the chuck-body flats.

12. The self-tightening chuck defined in claim 1 wherein the chuck body is formed with respective tightening-ring and locking-ring abutments and the tightening ring and locking ring are formed with respective notches receiving the respective abutments and having end faces constituting the respective stop formations.

13. The self-tightening chuck defined in claim 1 wherein the stop formations for limiting angular travel of the locking ring on the chuck body include cooperating formations on the tightening ring and the locking ring, whereby the angular travel of the locking ring is made up of the angular travel of the tightening ring on the chuck body plus the angular travel of the locking body on the tightening ring.

14. The self-tightening chuck defined in claim 1 wherein the tightening spring extends angularly and is braced axially between the tightening ring and the chuck body.

15. The self-tightening chuck defined in claim 1 wherein the adjustment sleeve and the locking body together extend a full axial length of the chuck body and completely enclose the tightening ring.

* * * * *